United States Patent [19]

Shama et al.

[11] Patent Number: 5,533,340
[45] Date of Patent: Jul. 9, 1996

[54] DOUBLE-WALLED CONTAINER FOR TRANSPORTING AND STORING A LIQUIFIED GAS

[75] Inventors: Elie W. Shama; Bertrand Legrand; Dominique Kluyskems, all of Quebec, Canada

[73] Assignees: Hydro-Quebec; Econoden Inc., both of Montreal; FRE Composites Inc., Quebec, all of Canada

[21] Appl. No.: 225,996

[22] Filed: Apr. 12, 1994

[51] Int. Cl.⁶ ................................................. F17C 1/00
[52] U.S. Cl. ................................................. 62/45.1; 220/901
[58] Field of Search ................................ 137/264, 375; 220/1.5, 408, 4.12, 469, 565, 901; 62/45.1

[56] References Cited

U.S. PATENT DOCUMENTS

| 1,979,221 | 10/1934 | Dana | 137/264 X |
| 3,425,585 | 2/1969 | Latham . | |
| 3,782,128 | 1/1974 | Hampton et al. . | |
| 4,038,832 | 8/1977 | Lutgen et al. | 62/45.1 |
| 4,098,426 | 7/1978 | Gerhard . | |
| 4,376,489 | 3/1983 | Clemens | 62/45.1 X |
| 4,674,289 | 6/1987 | Andonian | 220/901 X |
| 4,877,153 | 10/1989 | Varghese et al. | 220/469 |
| 4,976,110 | 12/1990 | Reid | 62/45.1 |
| 5,150,812 | 9/1992 | Adams . | |

FOREIGN PATENT DOCUMENTS

| 0063714 | 11/1982 | European Pat. Off. . |
| 0411506 | 2/1991 | European Pat. Off. . |
| 2303230 | 10/1976 | France . |
| 2548356 | 5/1977 | Germany . |
| 3001356 | 7/1981 | Germany . |
| 1220251 | 1/1971 | United Kingdom . |

OTHER PUBLICATIONS

Abstract of Japanese Pat. No. JP-A-61 224 472, vol. 11, No. 65 (E-484), Oct. 1986.

Primary Examiner—Kevin Lee
Attorney, Agent, or Firm—Foley & Lardner

[57] ABSTRACT

A double-walled container for transporting and storing a liquified gas or cryogenic liquid at low temperature. The container has an inner liquified gas holding vessel and an outer shell enclosing the inner vessel. The outer shell is coaxial with the vessel and of such a size as to provide a closed insulated space all around it. The inner vessel is suspended by its ends within the outer shell, with one end of the vessel being rigidly connected to the adjacent end of the shell while the other opposite end of the vessel is slidably connected to the other adjacent end of the shell so as to allow thermal expansion of the inner vessel and outer shell with respect to each other. Closable feeding and exit pipes pass through the outer shell and the inner vessel for introducing and draining the liquified gas into and off from the inner vessel. This container is light weight and can be of very great size; it can be used for the international transportation of liquid hydrogen by air, sea, rail or road.

22 Claims, 4 Drawing Sheets

DOUBLE-WALLED CONTAINER FOR TRANSPORTING AND STORING A LIQUIFIED GAS

BACKGROUND OF THE INVENTION a) Field of the invention

The present invention relates to a double-walled container for transporting and storing a liquified gas or cryogenic liquid such as hydrogen, at low temperature.

More particularly, the invention relates to a double-walled container of the above mentioned type, which is light weight and of a very great size and which can be used for the international transportation of liquid hydrogen by air, sea, rail or road.

b) Brief description of the prior art

Double-walled containers comprising an inner vessel mounted within an outer insulation shell are well known and widely used for transporting and storing liquified gases. To be efficient and safe in use, such containers must comply with several structural requirements related to their conditions of use. They must also comply with national and/or international regulations on dangerous products transportation.

One of these requirements is that the thermal conduction between the outer surface of the inner vessel which is cold, and the inner surface of the outer shell, must be as low as possible. In practice, a very good insulation is difficult to achieve.

Another requirement intimately related to the previous one is the time of storing and transportation of the liquified gases within the container, when the same is handled by air, rail, road or sea. The transportation time can sometimes be very long and an autonomy at least 30 days is often required. When heat conductive materials like stainless steel are used for manufacturing the container and no insulation is provided, an autonomy of a few days only can be achieved.

A further requirement is the weight of the container that must be low. If the container is exclusively made of a heavy material like stainless steel, its size will necessarily have to be reduced, thereby reducing the amount of liquified gases to be stored and transported. This, in turn, will limit the amount of liquified gases per container and increase the transportation price. In this connection, it is worth mentioning that the standard, all steel construction double-walled containers presently in use, are usually of a small or medium size only, and have a deadweight to pay load ratio ranging between 6:1 and 8:1.

To solve this problem, it has already been suggested to manufacture double wall containers from lightweight, gastight polymeric materials. This, however, has only been made with very small containers, like those sold under the trademark THERMOS (see also U.S. Pat. No. 5,150,812).

Still another requirement is the necessity of having reliable and efficient means for mounting and supporting the inner vessel within the outer shell. Indeed, the supporting means must be devised to safely absorb all kinds of force such as acceleration, deceleration or expansion forces during transportation, due to rail or road conveyor movements, ocean disturbances and airplane take-off or landing. To position and stabilize the inner vessel within the outer shell in such a manner as to leave an insulation gap in between, it has already been suggested to use ropes, tie rods, articulated bars or slide rails. It is obvious that these constructions are not only expensive but also very complicated and heavy (see, for example, EP-A-063,714 and GB-A-1,220,251, both to MESSER GRIESHEIM G.m.b.H).

OBJECTS OF THE INVENTION

A first object of the present invention is to provide a double-walled container for transporting a liquified gas, like hydrogen, by air, sea, road and rail, which comprises an inner vessel suspended, within an outer shell with suitable supporting means allowing the acceleration, deceleration or expansion forces on the inner vessel to be safely absorbed during an air, sea, rail or road trip.

Another object of the invention is to provide a double-walled container of the above type, whose inner vessel is made of stainless steel reinforced or not with a layer of composite material and whose outer shell is entirely made of composite material, thereby allowing for a deadweight to payload ratio of 5:1 or better, and for the substantial increase in the size of the container.

A further object of the invention is to provide a double-walled container which, thanks to the contained use of a composite material with an insulating material and vacuum, allows for the container autonomy to be increased up to 30 days or longer without undue loss of product and while withstanding all the pressure that may be encountered during the trip.

Still another object of the invention is to provide a double-walled container allowing for the transportation of a liquified gas in a safe manner thanks to the design of both its inner vessel and outer shell, that is adapted to foreseeable hazards in air, sea, rail or road and/or during handling to.

A further object of the invention is to provide a double-walled container for transporting a liquified gas which is easy and simple to manufacture and use, which provides good thermal insulation, which has a good mechanical strength and which can be easily oversized thanks to its low weight as compared to the known containers of the same size.

SUMMARY OF THE INVENTION

In accordance with the invention, the above objects are achieved with a double-walled container for transporting and storing a liquified gas at low temperature, which comprises:

- an inner liquified gas holding vessel having a longitudinal axis and a pair of opposite ends on the longitudinal axis; and
- an outer shell enclosing said inner vessel, the outer shell being coaxial with the vessel and of such a size as to provide a closed insulated space all around the inner vessel, the outer shell having a pair of opposite ends on the longitudinal axis.

The inner vessel is suspended by its opposite ends within the outer shell. More particularly, one of the opposite ends of the vessel is rigidly connected to the adjacent end of the shell while the other opposite end of the vessel is slidably connected to the other adjacent end of the shell so as to allow thermal expansion of the inner vessel and outer shell with respect to each other.

Means are provided at the opposite ends of the outer shell for supporting and handling the double-walled container.

Of course, a closable feeding pipe passes through the outer shell and the inner vessel for introducing the liquified gas within said inner vessel. Similarly, a closable exit pipe also passes through the inner vessel and the outer shell for draining the liquified gas off from the inner vessel.

Advantageously, the closed space between the inner vessel and outer shell can be kept under vacuum and the external surface of the inner vessel can be entirely covered by a thin layer of an insulation material to reduce the heat loss in use.

In accordance with a particularly preferred embodiment of the invention, the outer shell is made of a glass and/or carbon fiber-based composite material and the inner vessel is made of a thin sheet of stainless steel reinforced or not with an external layer of precompressed glass fiber-based composite material. These materials which support vacuum and very low temperatures, allow for a substantial reduction in the weight of the container, which can be as high as 25% as compared to the known containers of the same size. Internal reinforcing means can be used within the inner vessel to improve the mechanical strength of it.

The invention and its numerous advantages will be better understood upon reading of the following non-restrictive description of a preferred embodiment thereof, given with reference to the accompanying drawings wherein the same reference numerals have been used to identify the same structural elements.

DESCRIPTION OF A PREFERRED EMBODIMENT OF THE INVENTION

Figure 1:
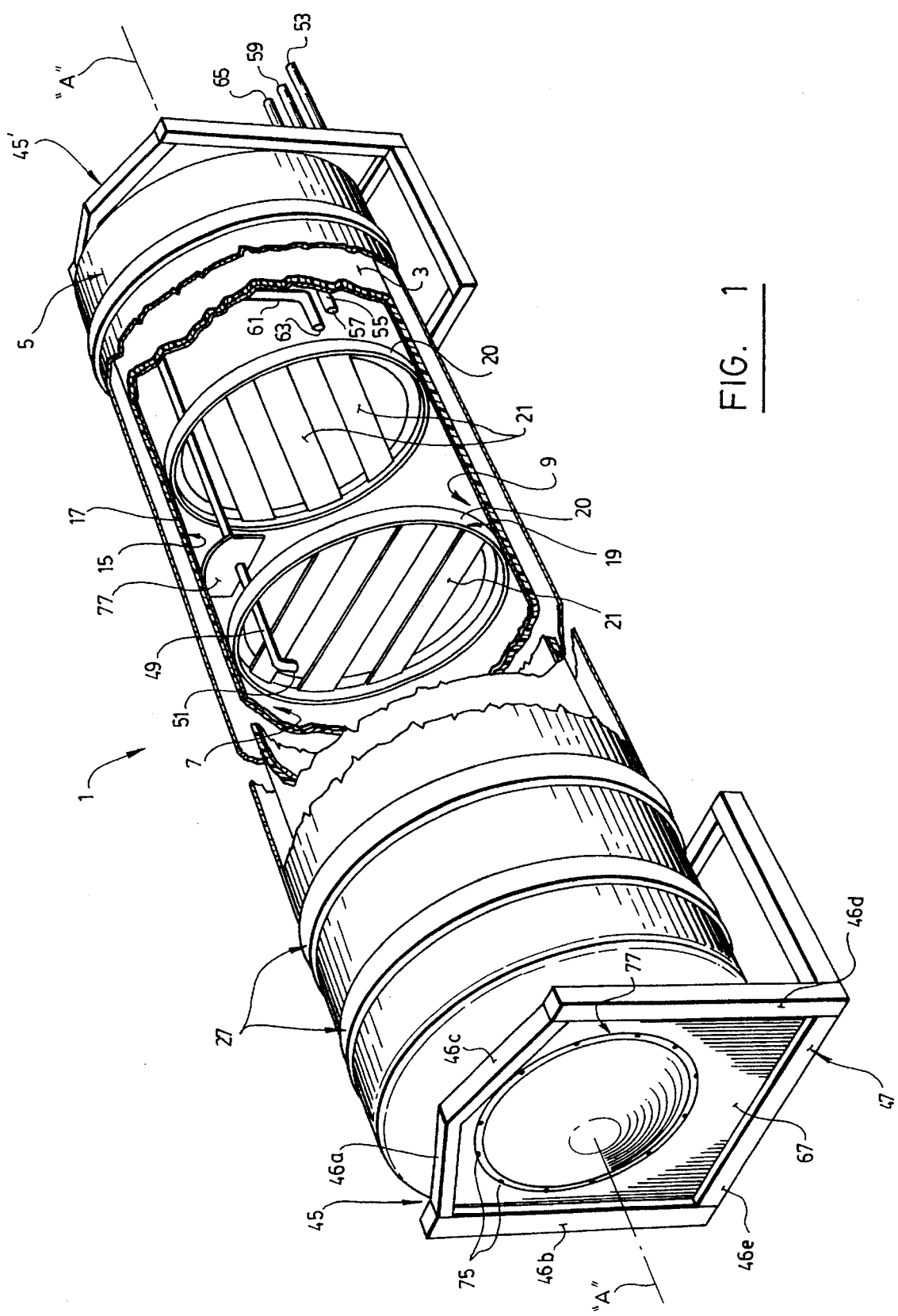
FIG. 1 is a semi-broken perspective view of a double-walled container according to the invention.

The double-walled container 1 according to the invention as shown in the accompanying drawings is intended to be used for transporting and storing a liquified gas such as liquid hydrogen by air, sea, road or rail.

This double-walled container 1 comprises an inner liquified gas holding vessel 3 and an outer shell 5 enclosing the inner vessel 3. It may be cylindrical in shape and have a length at about 25 meters and an external diameter of about 3.2 meters. Its volume may be as high as 120 m$^3$.

The inner, liquified gas holding vessel 3 is made of steel. As it is better shown in FIG. 2, it is generally cylindrical and has a horizontally-extending, longitudinal axis "A", a top surface 7, a bottom surface 9 and a pair of opposite ends 11, 11'. Each of these ends 11, 11' comprises an integral tubular projection 13, 13' extending along the longitudinal axis "A".

Figure 7:
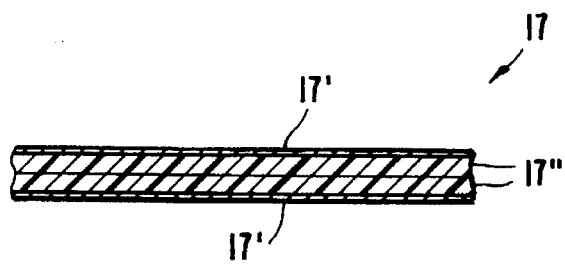
FIG. 7 is a cross-sectional view of a preferred embodiment of an insulation material used with the double-walled container shown in FIG. 1.

The inner vessel 3 also has an external surface 15 which is entirely covered by a thin layer of an insulation material 17. The insulation material 17 preferably consists of a plurality of aluminum foils 17' between which are inserted layers of insulated fabric 17" shown in FIG. 7. This specific insulation permits to keep the liquified gas at a temperature as low as 20° K. from 30 to 60 days, which is one of the objects of the invention. With such an insulation, the thermal conductivity of the container may be equal to or lower than 0.5 W/cm.° K.

The inner vessel 3 further comprises internal reinforcing means 19, to maintain the structure of the inner vessel 3. Each reinforcing means 19 preferably comprises a ring 20 of T-shaped cross-section internally welded to the inner vessel 3. Each ring 20 supports a plurality of strengthening plates 21 which extend transversally in parallel relationship across the vessel. The plates 21 of each ring 20 extend at an angle different from those of each adjacent ring 20. This particular arrangement may reduce uncontrolled movements of the liquified gas during transportation.

Figure 5:
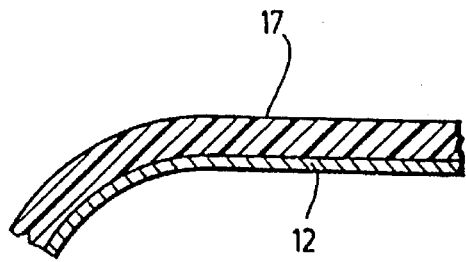
FIG. 5 is an enlarged cross-sectional view of the inner vessel of the container shown in FIG. 1, showing a first embodiment of the invention.
Figure 6:
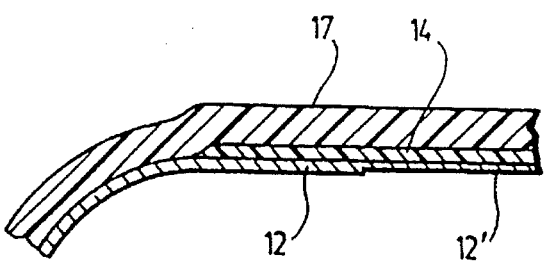
FIG. 6 is an enlarged cross-sectional view similar to that of FIG. 5, showing another embodiment of the invention.

According to a first embodiment of the invention, the inner vessel 3 can be made of a sheet of stainless steel 12 of constant thickness as is shown in FIG. 5. According to another, most preferred embodiment of the invention shown in FIG. 6, the inner vessel 3 can have a central portion of constant cross-section which is made of a stainless sheet 12' having a thickness lower than the average thickness of the sheet 12 forming the end portions of the vessel. This central portion is then reinforced by an external layer 14 of precompressed glass and/or carbon-fiber composite material, thereby allowing for a substantial reduction in weight without any reduction in strength.

Referring back to FIG. 2, the outer shell 5 enclosing the inner vessel 3 is coaxial with it and of such a size as to provide a closed insulated space 23 all around the inner vessel 3. This insulated space 23 is preferably kept under a vacuum of 10$^{-3}$ Torr or less, for proper insulation purpose.

Advantageously, the outer shell 5 is made entirely of a glass and/or carbon fiber-based composite material. It has a pair of opposite ends 25, 25' on the longitudinal axis "A" of the inner vessel 3 and comprises external reinforcing means 27 (see FIG. 2) which preferably consists of a plurality of ribs made of glass fiber-based composite material, that are integral to the outer vessel 5.

Means are provided at the opposite ends 25, 25' of the outer shell 5 for suspending the inner vessel within the outer shell 5. These means comprises an internal support 29 seen in Figs. I and 4, which is provided with an aperture 31 for receiving and holding the adjacent integral projection 13, 13' of the inner vessel 3.

Figure 2:
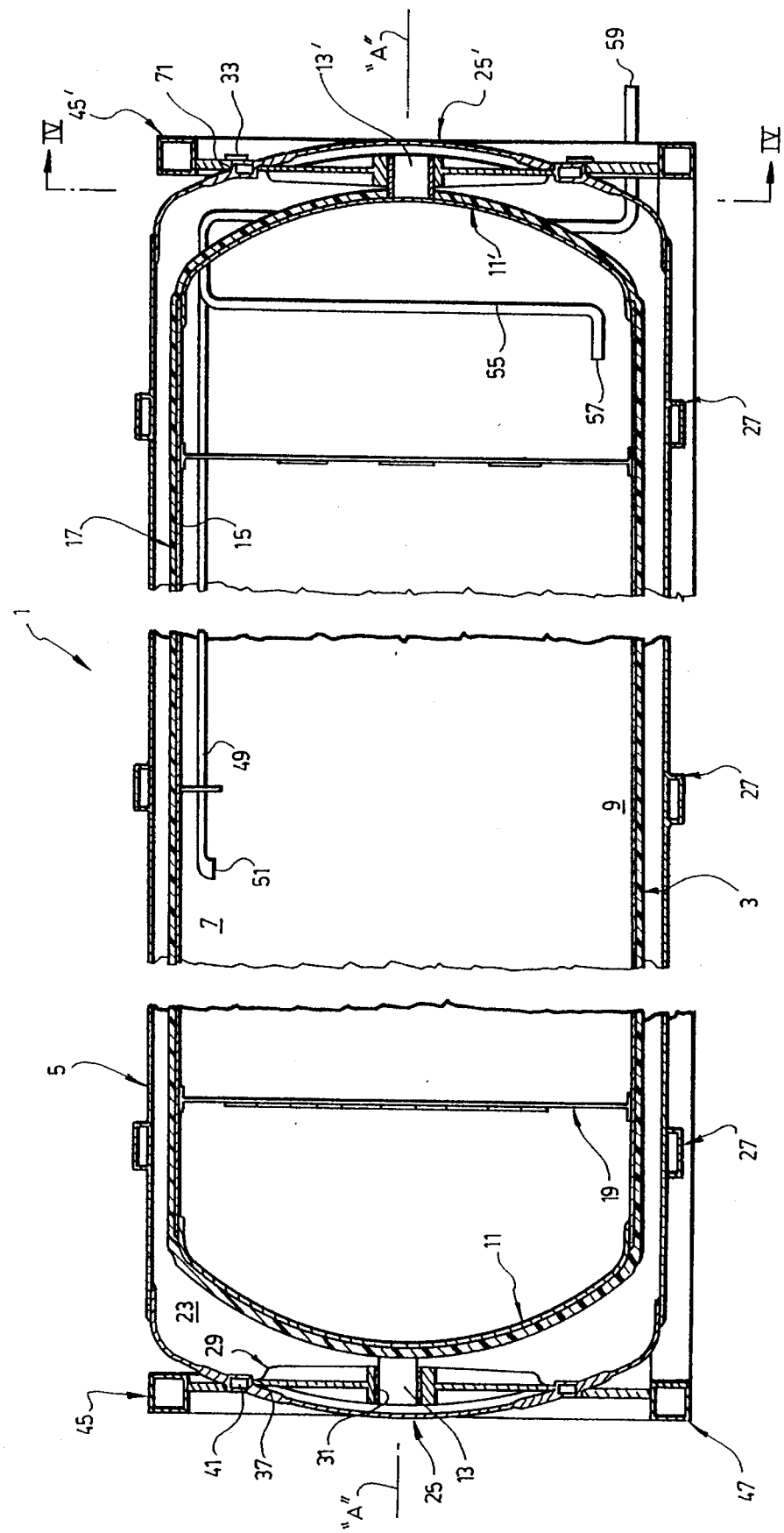
FIG. 2 is a side elevational view in cross-section of the double-walled container shown in FIG. 1, taken along lines II—II of FIG. 1.
Figure 4:
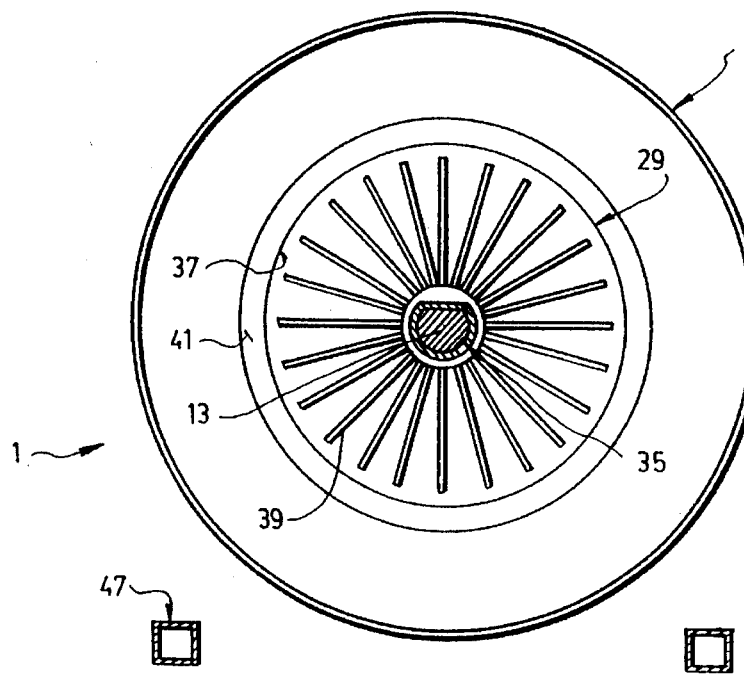
FIG. 4 is a front elevational view in cross-section of the double-walled container shown in FIG. 1, taken along lines IV—IV of FIG. 2.

As better shown in FIGS. 2 and 4, the internal support 29 comprises a circular holding plate 33 having a hub-like member 35 coaxially positioned on the longitudinal axis "A". This hub-like member 35 defines the aperture 31 which receives and holds in a not rotatable manner the adjacent projection 13, 13' of the inner vessel 3. To achieve the requested non-rotation, the hub-like member must not be cylindrical in shape (as is shown) or must include a key (not shown) engageable into a slot provided in the adjacent projection. The circular holding plate 33 also has a peripheral ring 37 and a plurality of reinforcing ribs 39 which radially extends from the hub-like member 35 to the peripheral ring 37. The internal support 29 is secured to the outer shell 5 within the same by connection preferably with bolts, of its peripheral ring 37 to a coaxial reinforcement ring 41 that can be made of steel and embedded into the outer shell 5. Thus, the inner vessel 3 is suspended by its opposite ends 11, 11' within the outer shell 5. In accordance with the invention, one end 11 of the opposite ends of the inner vessel 3 is rigidly connected to the adjacent end 25 of the shell 5 while the other opposite end 11' of the vessel 3 is slidably connected to the other adjacent end 25' of the shell 5 so as to allow thermal expansion of the inner vessel 3 and outer vessel 5 with respect to each other. When the container is 25 meters long, this expansion can be a high as 10 cms. As aforesaid, the integral projections 13, 13' and the corresponding aperture 31 are of a similar non cylindrical shape to prevent unwanted rotation of the inner vessel 3 relative to the outer shell about longitudinal axis "A". This embodiment is better shown in FIG. 4.

Figure 3:
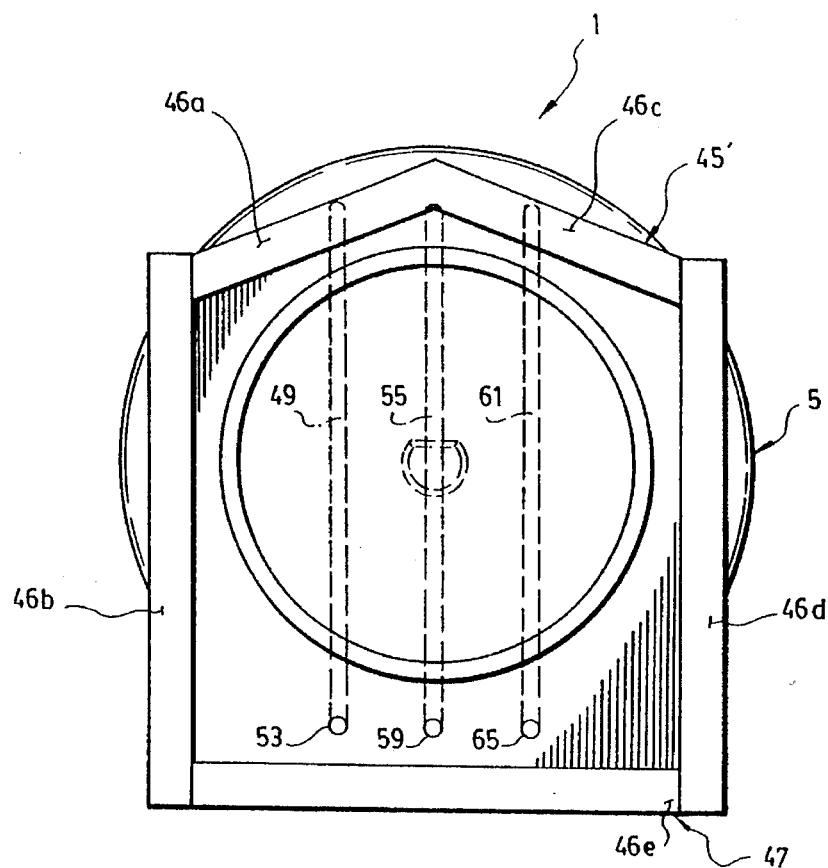
FIG. 3 is a rear elevational view of the double-walled container shown in FIG. 1.

The double-walled container 1 is supported and handled by suitable means mounted onto the opposite ends 25, 25' of the outer shell 5, as is better shown in FIGS. 2 and 3. These means comprise a pair of external frame members 45, 45' externally connected to the opposite ends 25, 25' of the outer shell 5, respectively. Each of the external frame members 45, 45' is rigidly secured to the reinforcement ring 41 embedded into each of the corresponding ends 25, 25' of the outer shell 5, and comprises a flat base 47 sized and positioned at such a distance away from the longitudinal axis "A" that the double-walled container 1 is allowed to be laid onto a flat surface, with its longitudinal axis "A" extending parallel to this flat surface as is shown in the drawings. As shown on FIGS. 1 and 3, each external frame members 45, 45' has a pentagonal shape and is provided with five reinforced edges 46a, 46b, 46c, 46d and 46e. The edge 46e defines the flat base 47 of the support means 43. The external frame member 45, 45' can be fixed to the reinforcing ring 41 embedded into an end 25 or 25' of the outer shell 5 by any suitable means such as bolts. For this purpose, the frame member 45, 45' may comprise a central wall 67 having a central aperture 71 for receiving ends 25, 25' of the outer shell 5. The aperture 71 is edged by a ring 77 comprising holes 73 for receiving fixation bolts 75 projecting from the adjacent reinforcement ring 41 of the outer shell 5.

The double-walled container 1 can be filled up with a liquified gas such a liquid hydrogen by means of a feeding pipe 49 passing through the outer shell 5 and inner vessel 3. Of course, the feeding pipe 49 must be closable by means of a suitable valve to be operative. The closable feed pipe 49 has an outlet 51 located substantially at mid-length within the inner vessel 3 close to the top surface 7 thereof for a regular, equal and simultaneous filling of all sections of inner vessel 3 with liquified gas. It has a closable inlet 53 extending outwardly of the outer shell 5 substantially at the level of the bottom surface 9 of the inner vessel 3 permitting a connection with an exterior pump (not shown) for filing the inner vessel 3 with liquified gas. The feeding pipe 49 is hold within the inner vessel 3 by holding means 77 secured to the bottom surface 7 of inner vessel 3.

The double-walled container 1 can be emptied by means of a closable exit pipe 55 passing through the inner vessel 3 and the outer shell 5. The pipe 55 drains the liquified gas off from the inner vessel 3. The closable exit pipe 55 comprises an inlet 57 located within the inner vessel 3 close to the bottom surface 9 thereof for a full evacuation of liquified gas and a closable outlet 59 extending outwardly of the outer shell 5 substantially at the level of the bottom surface 9 of the inner vessel 3, the closable outlet 59 being connectable to a pump (not shown) outside the container 1 for evacuating the liquified gas.

If desired, the inner vessel 3 can be provided with a closable gas pipe 61 close to the exit pipe 55, which passes through the inner vessel 3 and the outer shell 5 for injecting a gas within the inner vessel 3 in order to pressurize the inner vessel and thus push the liquified gas out of vessel 3 through the closable exit pipe 55 which, in such a case, does not need to be connected to a pump. This gas pipe 61 has an inlet 63 located within the inner vessel 3 close to the bottom surface 9 thereof and a closable outlet 65 extending outwardly of the outer shell 5 substantially at the level of the bottom surface 9 of the inner vessel 3.

All these main elements comprising the closable feeding pipe 49, exit pipe 55 and gas pipe 61 are made of rigid material and tightly extend through the inner vessel 3 and outer shell 5 at the opposite ends 11, 11'; 25, 25' of the same that are rigidly connected to each other.

Of course, different modifications could be made to the above embodiment without departing from the scope of the invention as defined in the appended claims,

What is claimed is:

1. A double-walled container for transporting and storing a liquified gas at low temperature, said container comprising:

an inner liquified gas holding vessel having a longitudinal axis and a pair of opposite ends on said longitudinal axis;

an outer shell enclosing said inner vessel, said outer shell being coaxial with said vessel and of such a size as to provide a closed insulated space all around said inner vessel, said outer shell being made of a composite material containing fibers selected from the group consisting of glass fibers, carbon fibers and mixtures thereof, and having a pair of opposite ends on said longitudinal axis;

said inner vessel being suspended by its opposite ends within said outer shell, one of said opposite ends of said vessel being rigidly connected to the adjacent end of the shell while the other opposite end of said vessel is slidably connected to the other adjacent end of the shell so as to allow thermal expansion of said inner vessel and outer shell with respect to each other;

means at the opposite ends of said outer shell for supporting and handling said double-walled container;

a closable feeding pipe passing through said outer shell and said inner vessel for introducing liquified gas within said inner vessel; and a closable exit pipe through said inner vessel and said outer shell for draining said liquified gas off from said inner vessel.

2. A double-walled container as claimed in claim 1, wherein said closed insulated space between said inner vessel and outer shell is kept under vacuum.

3. A double-walled container as claimed in claim 1 wherein said inner vessel has an external surface entirely covered by a thin layer of an insulation material.

4. A double-walled container as claimed in claim 3 wherein said insulation material consists of a plurality of aluminum foils between which are inserted layers of insulating fabric.

5. A double-walled container as claimed in claim 1, wherein said inner vessel is made of stainless steel.

6. A doubled-walled container as claimed in claim 5, wherein said inner vessel comprises a central portion of constant cross-section and two opposite end portions, said central portion having a wall thickness thinner than the average thickness of the end portions thereof and being reinforced by external layer of at least one of precompressed glass and carbon fiber-based composite material.

7. A double-walled container as claimed in claim 5, wherein said inner vessel comprises internal reinforcing means.

8. A double-walled container as claimed in claim 8, wherein said internal reinforcing means comprises a plurality of strengthening plates extending transversally at different angles across said vessel at given intervals along the same.

9. A double-walled container as claimed in claim 7, wherein said internal reinforcing means comprises a plurality of rings of T-shaped cross-section internally welded to said vessel at given intervals along the same, each ring supporting a plurality of strengthening plates extending transversally in parallel relationship across said vessel, the plates of each ring extending at an angle different from those of each adjacent ring.

10. A double-walled container as claimed in claim 7, wherein said outer shell comprises external reinforcing means.

11. A double-walled container as claimed in claim 10, wherein said external reinforcing means consist of ribs of said glass at least one of and carbon fiber-based composite material integral to said outer shell.

12. A double-walled container as claimed in claim 1, wherein:

said inner vessel has a top surface and a bottom surface;

said closable feed pipe has an outlet located substantially at mid-length within said inner vessel, close to the top surface thereof, and a closable inlet extending outwardly of said outer shell substantially at the level of the bottom surface of said inner vessel;

said closable exit pipe comprises an inlet located within said inner vessel close to the bottom surface thereof and a closable outlet extending outwardly of said outer shell substantially at the level of the bottom surface of said inner vessel.

13. A double-walled container as claimed in claim 12, further comprising:

a closable gas pipe passing through said inner vessel and said outer shell for injecting a gas within said inner vessel whenever required, said gas pipe having an inlet located within said inner vessel close to the bottom surface thereof and a closable outlet extending outwardly of said outer shell substantially at the level of the bottom surface of said inner vessel.

14. A double-walled container as claimed in claim 13, wherein said closable feed pipe, exit pipe and gas pipe are made of rigid material and tightly extend through said inner vessel and outer shell at the opposite ends of the same that are rigidly connected to each other.

15. A double-walled container as claimed in claim 1 wherein each of the opposite ends of said inner vessel comprises an integral projection extending along said longitudinal axis and wherein each of the opposite ends of the outer shell comprises an internal support rigidly secured to said outer shell and provided with an aperture for receiving and holding the adjacent integral projection.

16. A double-walled container as claimed in claim 15 wherein said internal support comprises a circular holding plate having a hub-like member coaxially positioned on said longitudinal axis, said hub-like member defining said aperture for receiving and holding the adjacent projection of the inner vessel, said circular plate also comprising a peripheral ring and a plurality of reinforcing ribs radially extending from said hub-like member to said peripheral ring.

17. A double-walled container as claimed in claim 16 wherein said internal support is secured to said outer shell within the same, by connection of its peripheral ring to a coaxial reinforcement ring embedded to said outer shell.

18. A double-walled container as claimed in claim 15, wherein said integral projections and corresponding apertures are of a similar non cylindrical shape to prevent unwanted rotation of the inner vessel relative to the outer shell about said longitudinal axis.

19. A double-walled container as claimed in claim 18, wherein said means for supporting and handling said double-walled container comprises a pair of external frame members externally connected to the opposite ends of the outer shell, respectively, each of said external frame members being rigidly secured to the reinforcement ring embedded into the corresponding end of the outer shell, and comprising a flat base sized and positioned away from said longitudinal axis at such a distance as to allow said double-walled container to be laid onto a flat surface with said longitudinal axis extending parallel to said flat surface.

20. A double-walled container as claimed in claim 19, wherein each of said external frame members has a pentagonal shape and is provided with reinforced edges, one of said edges defining said flat base.

21. A double-walled container for transporting and storing a liquified gas at low temperature, said container comprising:

an inner liquified gas holding vessel made of steel, said inner vessel having a top surface, a bottom surface, a longitudinal axis and a pair of opposite ends on said longitudinal axis, each of the opposite ends of said inner vessel comprising an integral projection extending along said longitudinal axis, said inner vessel having an external surface entirely covered by a thin layer of an insulation material and comprising internal reinforcing means including a plurality of strengthening plates extending transversally at different angles across said vessel at given intervals along the same; an outer shell enclosing said inner vessel, said outer shell being coaxial with said vessel and of such a size as to provide a closed insulated space all around said inner vessel, said insulated space being kept under vacuum, said outer shell being made of a composite material containing fibers selected from the group consisting of glass fibers, carbon fibers and mixtures thereof, and having a pair of opposite ends of said longitudinal axis and external reinforcing means, each of said opposite ends of the outer shell comprising an internal support rigidly secured to said outer shell and provided with an aperture for receiving and holding the adjacent integral projection;

said internal support comprising a circular holding plate having a hub-like member coaxially positioned on said longitudinal axis, said hub-like member defining said aperture for receiving and holding the adjacent projection of the inner vessel, in a not rotatable manner said circular plate also comprising a peripheral ring and a plurality of reinforcing ribs radially extending from said hub-like member to said peripheral ring, said internal support being secured to said outer shell within the same by connection of its peripheral ring to a coaxial reinforcement ring embedded to said outer shell, whereby said inner vessel is suspended by its opposite ends within said outer shell, with one of said opposite ends of the inner vessel being rigidly connected to the adjacent end of the shell while the other opposite end of said vessel is slidably connected to the other adjacent end of the shell so as to allow thermal expansion of said inner vessel and outer shell with respect to each other;

means at the opposite ends of said outer shell for supporting and handling said double-walled container, said means comprising a pair of external frame members externally connected to the opposite ends of the outer shell, respectively, each of said external frame members being rigidly secured to the reinforcement ring embedded into the corresponding end of the outer shell and comprising a flat base sized and positioned away from said longitudinal axis at such a distance as to allow said double-walled container to be laid onto a flat surface with said longitudinal axis extending parallel to said flat surface;

a closable feeding pipe passing through said outer shell and said inner vessel for introducing said liquified gas within said inner vessel, said closable feed pipe having an outlet located substantially at mid-length within said inner vessel, close to the top surface thereof, and a closable inlet extending outwardly of said outer shell substantially at the level of the bottom surface of said inner vessel;

a closable exit pipe passing through said inner vessel and said outer shell for draining said liquified gas off from said inner vessel, said closable exit pipe comprising an inlet located within said inner vessel close to the bottom surface thereof and a closable outlet extending outwardly of said outer shell substantially at the level of the bottom surface of said inner vessel; and a closable gas pipe passing through said inner vessel and said outer shell for injecting a gas within said inner vessel whenever required, said gas pipe having an inlet located within said inner vessel close to the bottom surface thereof and a closable outlet extending outwardly of said outer shell substantially at the level of the bottom surface of said inner vessel;

said closable feed pipe, exit pipe and gas pipe being made of rigid material and tightly extend through said inner vessel and outer shell at the opposite ends of the same that are rigidly connected to each other.

22. A double-walled container as claimed in claim 21, wherein said container is cylindrical in shape and has the following specifications:

a length at about 25 meters an external diameter of about 3.2 meters;

a volume of about 120 $m^3$; and a vacuum level in said insulated space of at about $10^{-3}$ Torr;

said insulation material consisting of aluminum foils in alternative with layers of insulating fabric so as to achieve thermal conductivity value equal to or lower than 0.5 W/cm.K;

whereby the liquified gas fed into the inner vessel can be kept at a temperature as low as 20° K. from 30 to 60 days.

* * * * *